United States Patent [19]

Magee et al.

[11] Patent Number: 4,991,638
[45] Date of Patent: * Feb. 12, 1991

[54] CARTRIDGE SHADE ASSEMBLY

[75] Inventors: Ted Magee, Hillsborough; Sean P. Magee, San Mateo, both of Calif.

[73] Assignee: Magee Plastics Company, Menlo Park, Calif.

[*] Notice: The portion of the term of this patent subsequent to Apr. 10, 2007 has been disclaimed.

[21] Appl. No.: 478,597

[22] Filed: Feb. 12, 1990

Related U.S. Application Data

[63] Continuation of Ser. No. 240,373, Aug. 26, 1988, Pat. No. 4,915,152.

[51] Int. Cl.$^5$ .............................................. E06B 9/08
[52] U.S. Cl. ........................................ 160/31; 160/239
[58] Field of Search .................... 160/31, 23.1, 32, 33, 160/98, 107, 239, 267, 271

[56] References Cited

U.S. PATENT DOCUMENTS

| 1,745,208 | 1/1930 | Dixson | 160/31 |
| 1,948,262 | 2/1934 | Gabriel | 160/31 |
| 2,328,263 | 8/1943 | Stefano | 160/23.1 |
| 2,580,776 | 1/1952 | Herman | 160/23.1 |
| 2,855,241 | 10/1958 | Walter | 160/23.1 X |
| 3,236,290 | 2/1966 | Lueder | 160/DIG. 7 X |
| 3,311,160 | 3/1967 | Barbour | 160/271 X |
| 4,427,048 | 1/1984 | Osaka et al. | 160/107 |
| 4,915,152 | 4/1990 | Magee | 160/239 X |

FOREIGN PATENT DOCUMENTS 1416431 12/1975 United Kingdom ............... 160/23.1

Primary Examiner—David M. Purol
Attorney, Agent, or Firm—Townsend and Townsend

[57] ABSTRACT

A shade assembly comprised of a frame having a central opening therethrough and a hollow, shell-like recess at one end thereof. A flexible shade member is removably received in the recess in the form of a scroll, and a pull bar coupled with one end of the shade member is used for pulling the shade member out of the recess, i.e., unscrolling or unwinding it, and into a position across the central opening of the frame. The shade member is biased so that, as the pull bar is moved toward the recess, the shade member becomes scrolled or wound in the recess. The end margins of the pull bar are removably received within a first pair of grooves on the opposed sides of the frame, and a transparent, protective pane is mounted with its side margins received within a second set of grooves on the sides of the frame adjacent to and extending longitudinally of the first set of grooves. The assembly is constructed in cartridge form so that it can be readily mounted in place as a unit at a fixed location, such as adjacent to a window of an airplane, and the assembly can be quickly removed from its mounting for replacement purposes.

9 Claims, 2 Drawing Sheets

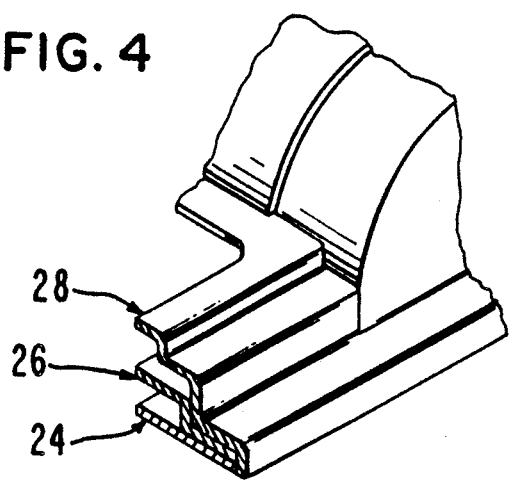
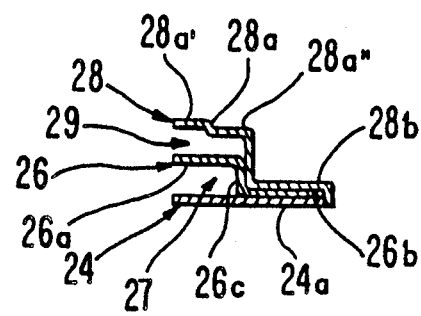
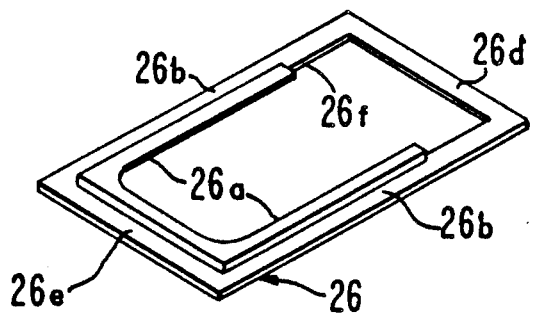
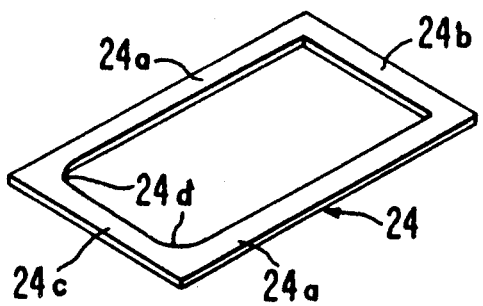
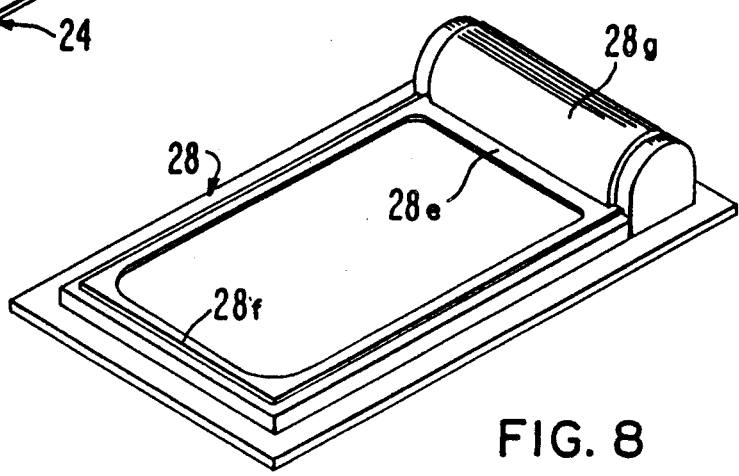
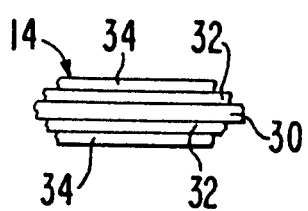

CARTRIDGE SHADE ASSEMBLY

This is a continuation of U.S. Pat. application Ser. No. 240,373, filed Aug. 26, 1988, now U.S. Pat. No. 4,915,152, which is a continuation of U.S. Pat. application Ser. No. 947,202, filed Dec. 29, 1986, now abandoned.

BACKGROUND OF THE INVENTION

Windows of large passenger airplanes typically have plastic, opaque shades on them which can be raised and lowered as desired to alternately open and block light flow through the windows. These shades, when soiled or otherwise marked on or damaged, often require replacement. Such replacement is a lengthy task and one which requires disassembly of a relatively large number of small parts merely to replace the shade itself. Generally, only the shade is replaced, the other parts of the shade assembly being used over and over again. Thus, because of these and other drawbacks, a need exists for a low cost shade assembly which can be quickly and easily replaced in the manner of replacing a cartridge to thereby minimize labor and production costs. The present invention satisfies this need.

SUMMARY OF THE INVENTION

The present invention is directed to a cartridge shade assembly which is simple and rugged in construction, can be quickly and easily installed in place or removed from its mounting when replacement is necessary, and which can be quickly and easily assembled as a cartridge for placement at a particular location, such as in the window opening adjacent to a passenger seat of a commercial or private airplane.

To this end, the cartridge shade assembly of the present invention includes a frame having a central opening and a shell-like recess at one end of the frame for receiving a shade member wound in the form of a scroll, the shade member being coupled at one end thereof to a pull bar whose end margins are shiftably received within a pair of grooves in the opposed sides of the frame. The shade member is designed and constructed to have and inherent bias such that one side of the shade member always tends to go into compression while the opposite side of the shade member tends to go into tension. Thus, as the pull bar is shifted in one direction to close the central opening of the frame with the shade member, the shade member will uncoil from its scrolled condition in the recess of the frame and, conversely, the shade member will return to the recess by scrolling as the pull bar moves in the opposite direction and as the shade member moves out of closing relationship to the central opening of the frame.

A transparent plastic pane can also be provided with the assembly. Such a pane has a pair of side margins which are removably received within a second pair of grooves in the sides of the frame. thus, both the pull bar and the pane can be quickly and easily inserted into respective grooves in the sides of the frame in constructing the assembly. Thus, when properly constructed, the assembly of the present invention will form a cartridge which can be made in volume and used as desired for quick replacement purposes rather than, as in the case of the conventional shade units for an airplane window, to disassemble the various parts of the shade unit, replace the damaged shade member, and then reassemble the parts of the unit, all of which takes a considerable amount of time and effort.

The primary object of the present invention is to provide an improved shade assembly in cartridge form wherein the assembly includes a frame having a central opening which is opened and closed when a shade member carried in scroll form by the frame is moved in opposed direction relative to and across the frame, whereby the shade assembly can be installed as a unit quickly and easily and can be removed as a unit when replacement of the shade member is required.

Another object of the present invention is to provide a cartridge shade assembly of the type described wherein the shade member and a pull bar at one end thereof can be quickly and easily assembled to the frame to minimize production costs yet the cartridge shade assembly has a attractive appearance not withstanding its construction in the form a cartridge thereof.

Other objects of this invention will become apparent as the following specification progresses, reference being had to the accompanying drawings for an illustration of an embodiment of the invention.

IN THE DRAWINGS

Figure 1:
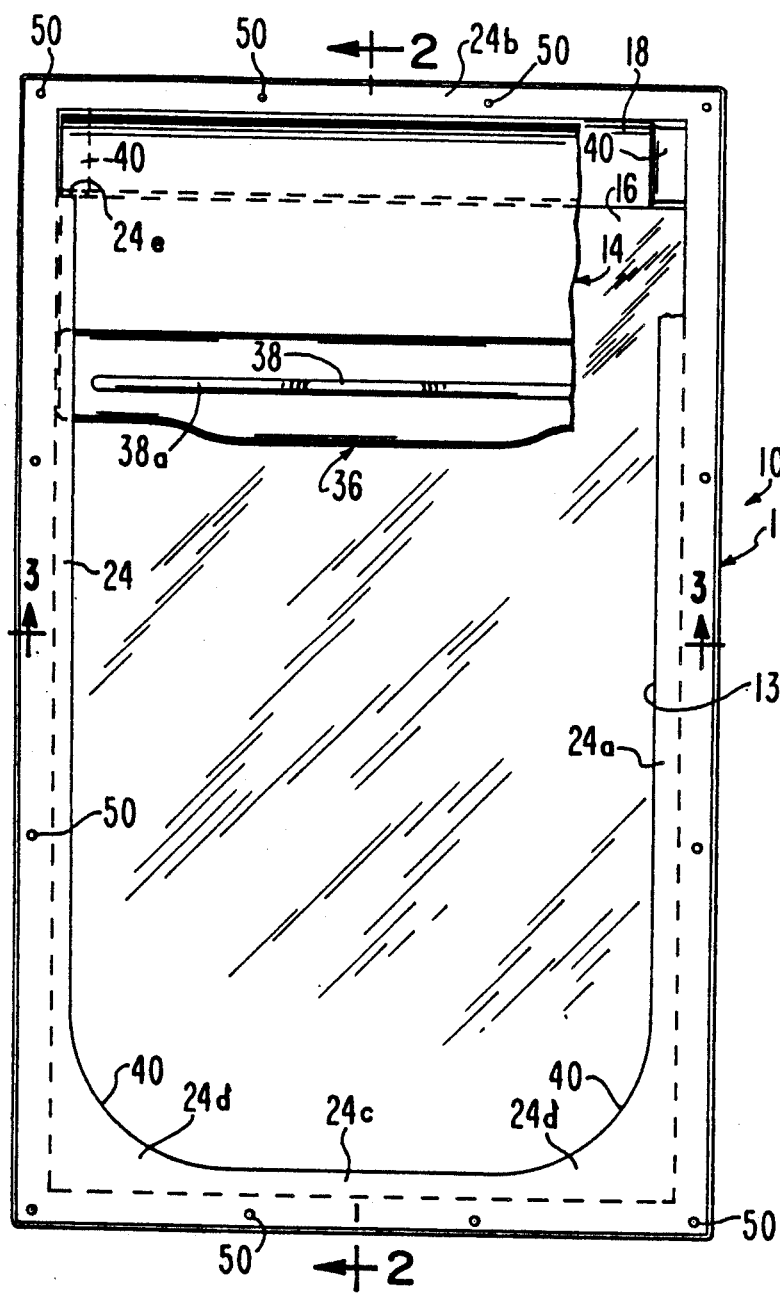
FIG. 1 is a front elevational view of the cartridge shade assembly of the present invention, parts being broken away to illustrate details of construction.
Figure 2:
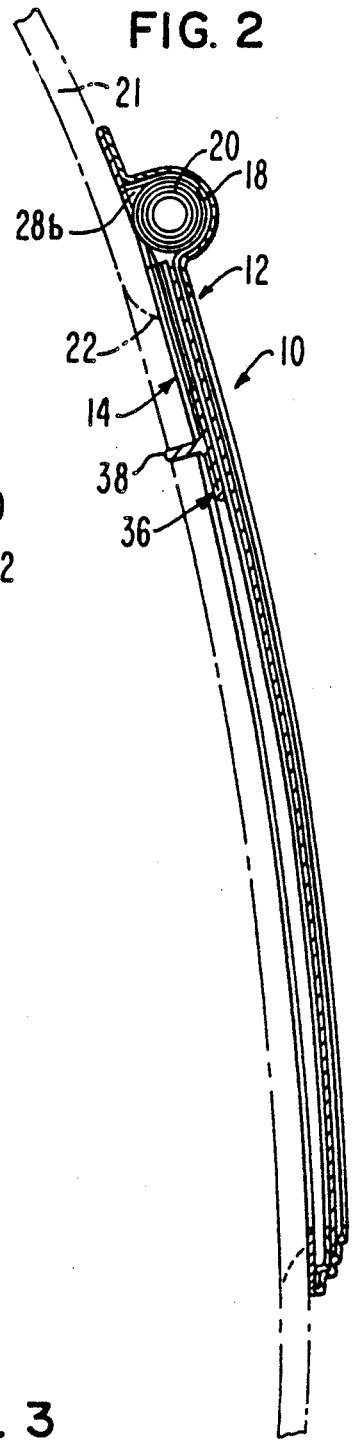
FIG. 2 is a cross sectional view taken along line 2—2 of FIG. 1.
Figure 3:
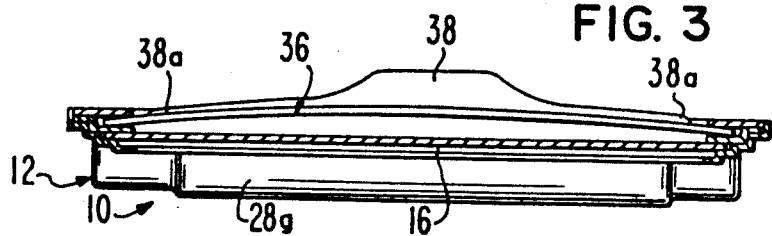
FIG. 3 is a cross sectional view taken along line 3—3 of FIG. 1.

FIG. 4 an enlarged, perspective view of a part of the cartridge shade assembly of FIGS. 1-3, showing the grooves for the edge margins of a shade member and a transparent pane;

FIG. 5 is a fragmentary, cross sectional view of the frame for the shade assembly, showing the relative sizes of the grooves for the shade member and pane, respectively;

FIG. 6 is a perspective view of the middle one of three stacked parts which form the frame;

FIG. 7 is a perspective view of a first outer part of the frame;

FIG. 8 is a perspective view of the other outer part of the frame; and

FIG. 9 is an enlarged fragmentary cross-sectional view of the shade member showing the various layers thereof.

The cartridge shade assembly of the present invention is broadly denoted by the numeral 10 and includes a frame 12 having a large, central opening 13 and providing the means for mounting a flexible, plastic, opaque shade member 14 and a relatively rigid, transparent, plastic pane 16. The frame has a recess 18 near the normally uppermost end thereof for receiving the shade member in the form of a scroll 20 (FIG. 2).

Frame 12 is adapted to be mounted in any suitable manner in a fixed position, such as on mounting structure 21 of an airplane, so as to provide a window shade across a window opening 22 (FIG. 2) of structure 21. Thus, shade member 14 can be pulled downwardly and upwardly relative to frame 12 so as to alternately close and open the central opening 13 of frame 12 and thereby opening 22 of airplane body 21. As the shade member is pulled downwardly relative to frame 12, the shade member unrolls or unscrolls from its scrolled form in recess 18. Conversely, as the shade member is raised, it scrolls or winds up in recess 18 due to the inherent resilience of the shade member which biases it into the scroll form automatically with the raising of the shade member.

Frame 12 is made of any suitable, relatively rigid plastic material. A material suitable for this purpose is a polycarbonate, such as LEXAN made by General Electric Plastics Corporation. Frame 12 is made of three parts 24, 26 and 28 which are suitably bonded together to form a unitary construction for frame 12.

In the alternative, parts 24, 26 and 28 can be integral with each to form a one-piece construction. FIG. 4 shows a portion of the rear face of frame 12 and FIG. 5 shows a cross sectional view of the three parts 24, 26 and 28 and their relative positions. The parts are all frame like in construction in that they have a top, bottom and pair of sides. The sides of each of frame parts 24, 26 and 28 are curved in the manner shown in FIG. 2 so as to conform to the curvature of structure 21. Such structure typically follows the inner surface contour of the fuselage of the airplane with which shade assembly 10 is used. The sides of parts 24, 26 and 28 could be straight for other applications.

Frame part 24 has a pair of sides 24a, a top strip 24b (FIG. 1), a bottom strip 24c. Top strip 24b (FIG. 1), a bottom strip 24c. Top strip 24b and bottom strip 24c are integral with sides 24a, and sides 24a have curved, corner webs 24d near the bottom strip 24c as shown in FIG. 1. Each side 24a has a rectangular notch 24e (FIG. 1) near the upper end thereof for forming the front opening of recess 18.

Part 26 has a pair of curved sides which are formed by offset side portions 26a and 26b interconnected by a web 26c (FIG. 5). Each side portion 26a forms with the adjacent side 24a of part 24 a groove denoted by the numeral 27 for receiving an end margin of a curtain bar hereinafter described.

Frame part 26 (FIG. 6) includes a top strip 26d and a bottom strip 26e, the top and bottom strips being integral with side strip portions 26b and bottom strip 26e. The length of side strip portions 26a is less than that of side strip portions 26b so as to present rectangular a notch 26f (FIG. 6) to accommodate scroll 20 when the latter is inserted into recess 18 after frame parts 24, 26 and 28 have been coupled together in operative fashion shown in FIGS. 4 and 5.

Frame part 28 includes a pair of sides formed by side portions 28a and 28b (FIG. 5), the side portions being interconnected by a web 28c. Side portions 26b and 28b are connected to each other and to sides 24 by welds or by an adhesive so that the three frame parts 24, 26 and 28 form a unitary frame, namely frame 12.

Each side portion 28a has a first part 28a' which is offset from and parallel to a second part 28a". This configuration for each side portion presents a groove 29 which is of two widths as shown in FIG. 6, the wider width being near the inner periphery of frame 12 and the narrower width being near the outer periphery of frame 12. The two different widths are provided to accommodate panes 16 of different widths, the narrower width being provided for a relatively thin pane 16 and the wider width being provided for a relatively thick pane. A thicker pane is used in windows of an airplane near the noisier parts of the airplane, such as near the engine or near the front end of the airplane, a thicker pane providing a greater reduction than a thinner pane in the noise level in the airplane cabin with which shade assembly 10 is associated.

Frame part 28 further has a top strip 28e (FIGS. 4 and 8) and a bottom strip 28f (FIG. 8), top and bottom strips 28e and 28f being integral with the sides 28a of frame part 28. Also, a shell like, elongated member 28g (FIG. 8) is integral with frame part 28 near the upper ed thereof, member 28g having a front opening 28h (FIG. 2) defined by notch 24e (FIG. 1) through which scroll 20 can be inserted into the interior of member 28g.

Shade member 14 can be of any suitable construction so long as it is flexible and can be scrolled or wound up into a scroll 20 when the lower end of the shade member is raised. A typical construction for shade member 14 is one which includes a thin layer 30 (FIG. 9) of aluminum which is coated on opposed sides with layers 32 of a suitable plastic, such as Mylar. The outer faces of the Mylar layers are preferably coated with another plastic material such as Tedlar, layers 30, 32 and 34 being sufficiently thin such as 0.005 inch in thickness. Moreover, shade member 14 with its various layers is designed so that one face of the shade member always under compression as the other face of the shade member is always under tension. This feature will assure that the shade member will roll into the form of scroll 20 as the lower end of the shade member is lifted with reference to the lower part of assembly 10 as shown in FIG. 1.

A pull bar 36 is secured to the lower end of shade member 14 in any suitable manner. Typically, bar 36 is of a suitable, relatively rigid plastic material such as polycarbonate. The lower margin of the shade member 14 can, for instance, be sandwiched between two halves of bar 36 and then secured by rivets or bonded by adhesive to the bar. A laterally projecting handle 38 on bar 36 allows the bar to be raised and lowered by merely grasping the handle 38 with the fingers of one hand. Preferably, bar 36 has a bow in it as shown in FIG. 3. This bow feature is to inpart a convex front face shape to the front face of shade member 14 to provide an aesthetic appearance for the shade member when it is pulled downwardly and partially or fully covers the opening 14.

The length of bar 36 is sufficient to allow the end margins of the bar 36 to enter and to be normally shiftably received within grooves 27 at the sides of frame 12, frame 12 being formed as shown in FIG. 5. Likewise, the width of shade member 14 is the same width as bar 36 so that the shade member will also enter and be normally shiftable in grooves 27 along with bar 36. Grooves 27 extend completely to the bottom of the frame 12, and the outer ends 38a (FIG. 1) of projection 38 eventually engage the inner peripheral edges 40 (FIG. 1) at the bottom of opening 13 so that such edges 40 serve as stops for the downward movement of bar 36 and thereby shade member 14.

Notch 24e (FIG. 1) is formed in frame 12 to allow insertion of bar 36 partially into recess 18, sufficiently far so that the end margin of the bar 36 can become aligned with grooves 27 and can then be pulled downwardly relative to recess 18 and into the grooves 27, the upper ends of grooves 27 being open and communicating with recess 18 to thereby allow the ends of the bar 36 to readily enter the grooves 27 and shade member 14 scrolled in recess 18. When properly scrolled and received in recess 18, shade member 14 will have a tangential portion aligned with the open ends of grooves 27 so that, once the end margins of bar 36 are in grooves 27, the bar can be shifted manually up and down and thereby alternately close and open the opening 13 formed by frame 12.

Shell-like member 28g has a pair of curved shoulders 40 (FIG. 1) integral therewith at the ends thereof and within recess 18. The cylindrical inner surfaces of shoulders 40 define bearing surfaces for mounting the ends of the scroll 20 when shade member 14 is in a scroll form within recess 18. Thus, the entire outer surface which defines the scroll 20 does not contact the major inner peripheral surface of recess 18, thereby minimizing the frictional contact between shade member 14 and the interior surface of member 28g.

To construct assembly 10, the three parts 24, 26 and 28 are molded separately and, then they are mated and secured together to form frame 12. Then, transparent plastic pane 16 is inserted at the side margins thereof into grooves 29 through the open upper ends thereof, the pane being forced into grooves 29 until the pane reaches the bottom ends of the groove. When this occurs, the upper marginal edge of pane 16 is directly below the shoulders 40 (FIG. 1).

After insertion of pane 16 in place, bar 36 is forced into grooves 27. This occurs after the shade member 14 has been would in the form of scroll 20 and inserted into recess 18. To cause the bar 36 to become aligned with the open upper ends of grooves 27, the bar is placed in the position directly and horizontally aligned with recess 18. The bar is forced inwardly into notch 24e (FIG. 1) into the recess until the end margins of the bar become aligned with the open upper ends of grooves 27. Then a downward force is exerted on the bar 36 until the end margins thereof enter and slide along the grooves 27, whereupon the shade member 14 is then coupled with frame 12 and the assembly 10 is then ready for mounting to body 21.

The frame 12 is provided with a plurality of holes 50 therethrough for receiving fasteners for attaching the frame and thereby assembly 10 to body 21.

Assembly 10 is placed against the outer surface of structure 21 and then fasteners (not shown) are coupled through holes 50 and to structure 21 for attaching assembly 10 to structure 21. When this occurs, a portion of structure 21 overlies or lies in front of the open front end of recess 18 so as to cover the recess and thereby conceal scroll 20 in the recess. When assembly 10 is mounted in this manner, the shade member 14 can be moved downwardly and upwardly by pulling downwardly or upwardly on bar 36. The upper margin of body 21 which defines opening 22 will be engaged by bar 36 to limit the upward movement of the bar. The downward movement of the bar is limited by marginal edges 40 of webs 24d (FIG. 1).

A major feature of assembly 10 is its quick assembly as a cartridge into position adjacent to structure 21 for attachment thereto. When it is desired to replace shade member 14, such as when it is damaged, the entire assembly 10 can be quickly and easily removed from attachment to structure 21 and replaced with a new cartridge shade assembly 10. In this way, the old assembly can be discarded or rejuvenated as desired or deemed necessary.

Certain structural changes can be made to assembly 10 without departing from the spirit of the invention. For instance, the sides of frame 12 can be straight instead of curved so that the sides will be coplanar with the top and bottom of the frame. Also, the frame can have shapes other than the rectangular shapes shown in FIG. 1. The shade assembly can also be adapted for use in areas other than airplane use. For instance, it can be used in vans and stationwagons and can be used even for home use, such as closures for cabinets. Furthermore, the shade member 14 can be transparent, translucent or perforate to suit specific application needs.

I claim:

1. A cartridge shade assembly comprising:
a frame adapted to be removably mounted to a support in fixed position, said frame being formed from a number of molded parts bonded together to form a unitary construction, said parts having respective webs spaced apart to form a pair of side grooves;
means on the frame for defining a shell-like recess therein; a flexible shade member of a material having an inherent bias so as to be normally in the form of a scroll, said shade member being free of any structure connecting the shade member to the frame, whereby the shade member is loosely receivable in the form of a scroll in the recess, said shade member being an opaque laminated composite; and
a pull bar having a pair of opposed ends and being secured to one end of the shade member, said grooves being located for shiftably receiving the ends of the bar for guiding the bar and thereby the shade member longitudinally of the frame as the bar moves along the path, the frame and the shade member being movable as a unit into and out of said fixed position to provide a cartridge-like replaceability for said assembly.

2. An assembly as set forth in claim 1, whereas is included a transparent pane adjacent to and extending longitudinally of said path of travel of the shade member and bar, said pane being removably coupled with said frame.

3. An assembly as set forth in claim 1, wherein is included surface means at the ends of the recess for forming bearings for engaging the shade member when the latter is in a form of a scroll in the recess.

4. An assembly as set forth in claim 1, wherein the sides of the frame and grooves are curved.

5. An assembly as set forth in claim 1, wherein the frame has a notch near the recess thereof, the notch being aligned with the recess, said bar being insertable into the notch to allow the ends of the bar to become aligned longitudinally with the grooves, whereby the ends of the bar can enter the grooves after being pulled longitudinally of the frame away from the recess.

6. An assembly as set forth in claim 5, wherein the entire extent of the shade member is receivable in the form of a scroll in the recess when the bar is in a position in the notch.

7. An assembly as set forth in claim 1, wherein the bar is bowed outwardly of the central opening of the frame.

8. An assembly as set forth in claim 1, wherein said opaque laminated composite includes a layer of metal and a layer of plastic.

9. An assembly as set forth in claim 8, wherein the metal is aluminum.

* * * * *